United States Patent Office 3,528,830
Patented Sept. 15, 1970

3,528,830
REFRACTORY COMPOSITION
Ben Davies, Pittsburgh, Pa., assignor to Dresser Industries, Inc., Dallas, Tex., a corporation of Delaware
No Drawing. Filed Mar. 5, 1968, Ser. No. 710,671
Int. Cl. C04b 35/42; 35/48
U.S. Cl. 106—57          5 Claims

ABSTRACT OF THE DISCLOSURE

Burned refractory compositions consisting essentially of 5 to 20%, by weight, zircon, 20 to 50% chrome ore, and 30 to 75% dead burned magnesite.

BACKGROUND

Basic refractory compositions are those which are resistant to basic slags at elevated temperatures. On the other hand, nonbasic refractories are those that are resistant to acid slags at elevated temperatures. As a general rule, basic refractory materials and nonbasic refractory materials are not combined in the same composition. An exception to this general rule has recently been discovered and as is described in U.S. Pat. No. 3,192,059 of which I am a coinventor. In that patent, a magnesite-zircon composition is disclosed which is characterized by coarse textured periclase grain bonded together by forsteritic matrix, which matrix is the reaction product of an in situ solid-state reaction between periclase of the dead burned magnesite and silica of the zircon. These shapes are also characterized by spaced deposits of stabilized zirconia distributed throughout the forsteritic matrix. They are also characterized by exceptional low porosity and good resistance to cyclic temperatures as are found, for example, in glass tank regenerators.

The present invention is considered an improvement over U.S. Pat. No. 3,192,059 wherein basic compositions are provided which have increased intermediate temperature strength measured by modulus of rupture at 2300° F. and increased resistance to thermal shock as a result of having a lower modulus of elasticity and increased tensile strength.

Brick made according to the teachings of this invention should be useful in the walls of glass tank regenerators and even in some cases in the checker structure of glass tank regenerators. Other applications of brick according to his invention will be obvious to those skilled in the refractories art.

BRIEF DESCRIPTION OF THE INVENTION

According to this invention, burned basic refractory compositions are prepared from a batch consisting essentially of 50 to 20%, by weight, zircon sand, 20 to 50% chrome ore, and 30 to 75% dead burned magnesite. The zircon sand is sized to all pass 65 mesh. The chrome ore is sized to substantially all pass 14 mesh and at least 50% passes 28 mesh. The chrome ore sizing is considered critical. The magnesite is sized such that at least 20% is minus 65 mesh or ball milled fines. The rest of the magnesite is sized so that the overall sizing of the batch is from 40 to 60% plus 28 mesh, and from 40 to 60% minus 65 mesh. Basic compositions, according to this invention, are burned at temperatures in excess of 2800° F. to develop a ceramic bond. They are microscopically characterized by a coarse chrome ore and magnesite grain held by a discontinuous forsterite matrix containing dispersed stabilized zirconia deposits. Forsteritic matrix is a reaction product of an in situ solid-state reaction between the periclase of the dead burned magnesite and the silica of the zircon.

The chromite materials employed in the present invention include natural chromite or chrome ores, which can be any refractory chromite, such as Philippine, Turkish, African, including Rhodesian and the like, Grecian or other chromite ore or beneficiated chromite ore of the type ordinarily useful in refractories in this art. Refractory chrome ores preferably contain less than 6% silica.

The magnesia component of refractory compositions according to this invention is dead burned magnesite or periclase or fused magnesite as commonly used in the brickmaking art, and it preferably contains at least 90% magnesium oxide. More refractory products and still better results are obtained with higher purity periclase, especially that containing at least 95% magnesium oxide.

Zircon is avaiable as a constituent for refractory use only as a rather fine sand or comminuted sand. Almost without exception, the present world supplies consist of sand whose largest particles will pass a 50 mesh sieve.

DETAILED DESCRIPTION

Further features and other objects and advantages of this invention will become clear to those skilled in the are by a careful study of the following detailed description. In the specification and claims, all percentages and ratios and parts are by weight; chemical analyses were obtained by spectrographic analysis with control by wet chemical analysis, and are reported as oxides in accordance with the present practice of the refractories industry. All sizings are measured by Tyler series sieves.

Examples A and B

Refractory brick were prepared from the batches described in Table I. The batches were tempered with a temporary binder, for example, ligno sulfonate liquor and pressed into shapes, for example, at about 8000 p.s.i. The brick were dried overnight at about 250° F. and thereafter burned at about 2800° F. with a 10 hour hold at the maximum temperature. The brick were then subjected to the typical test for refractory brick. The results of this testing are also included in Table I.

TABLE I

| Examples | A | B |
| --- | --- | --- |
| Philippine chrome ore (percent): | | |
|   −4 +28 mesh | 6 | 20 |
|   −28 mesh | 24 | 20 |
| Dead burned magnesite: | | |
|   −4 +10 mesh | 25 | 23 |
|   −10 +28 mesh | 8 | |
|   Ball milled fines | 29 | 29 |
| Zircon −600 mesh | 8 | 8 |
| Bulk density, p.c.f.[1] | 192 | 194 |
| Modulus of rupture, p.s.i.: | | |
|   At room temperature[2] | 630 | 730 |
|   At 2,300° F | 1,340 | 1,220 |
| Apparent porosity[3] (percent) | 17.1 | 16.9 |
| Modulus of elasticity, p.s.i.[4] | $1.94 \times 10^6$ | $2.15 \times 10^6$ |

[1] ASTM Test C134–41.
[2] ASTM Test C133–55.
[3] ASTM Test C20–46.
[4] Sonic method, see Journal American Ceramic Society, 37 (11) 1954, pages 445–457.

Examples A and B are according to the teachings of this invention. Example A is the best mode and preferred embodiment for the practice of this invention.

Examples C and D

By way of comparison, Examples C and D were prepared from the batches contained in Table II, according to the teachings of my prior patent, referred to above. They were prepared in substantially the same manner as Examples A and B, except that no chrome ore addition was made to the batch. They were subjected to the same tests as Examples A and B.

TABLE II

| Examples | C | D |
|---|---|---|
| Dead burned magnesite (percent): | | |
| −3 +8 mesh | 30 | 30 |
| −8 +28 mesh | 35 | 35 |
| Ball milled fines | 25 | 15 |
| Zircon, −600 mesh | 10 | 20 |
| Bulk density, p.c.f. | 184 | 187 |
| Modulus of rupture, p.s.i., at 2,300° F | 640 | 900 |
| Apparent porosity (percent) | 16.0 | 16.0 |
| Modulus of elasticity, p.s.i. | 14.0×10⁶ | 7.2×10⁶ |

Table II establishes that the chrome ore additions surprisingly increases intermediate temperature strength without also increasing modulus of elasticity as would be expected. As a matter of fact, modulus of elasticity is considerably decreased by the chrome ore addition.

Example E

Also by way of comparison, Example E was prepared without zircon from the batch given in Table III in a manner very similar to Examples A and B. The results of testing brick made according to Example E are given in Table III.

TABLE III

Philippine chrome ore.— −14 mesh, 30%
Dead burned magnesite.—
 −4 +10 mesh, 35
 −10 +28 mesh, 8
 Ball milled fines, 27
Bulk density, pcf., 184
Modulus of rupture, p.s.i., at 2300° F., 410
Apparent porosity (av. 3), 19.5%

Table III shows that the addition of zircon to compositions according to this invention considerably increases the intermediate temperature strength. This is somewhat surprising when considering that the microstructure of brick according to this invention is characterized by chrome ore-magnesia particles held together by a discontinuous forsterite matrix.

Example F

Example F was prepared in the manner similar to the foregoing examples from the batch given in Table IV. Example F was subjected to the same tests as Examples A and B.

TABLE IV

Philippine chrome ore.—
 −3½ +6 mesh, 15%
 −6 +28 mesh, 15
Dead burned magnesite.—
 −4 +10 mesh, 10
 −10 +28 mesh, 25
 Ball milled fines, 19
Zircon, −600 mesh, 16
Bulk density, pcf., 197
Modulus of rupture, p.s.i.—
 At room temperature, 470
 At 2300° F., 870
Apparent porosity, 15.2%
Modulus of elasticity, p.s.i., 1.3×10⁶

Example F demonstrates the critical nature of the chrome ore sizing in the practice of this invention. It is essential that the chrome ore be substantially all minus 14 mesh, and at least about 50% minus 28 mesh. Coarser chrome ore destroys the intermediate temperature strength.

The chemical analyses of the raw materials used in the exemplary mixes are given below:

| | Percent | | |
|---|---|---|---|
| | Zircon | Dead Burned Magnesite | Philippine Chrome Ore |
| Silica (SiO₂) | 32.3 | 2.8 | 5.5 |
| Alumina (Al₂O₃) | 1.0 | 0.3 | 28.9 |
| Titania (TiO₂) | 0.2 | | |
| Iron Oxide (Fe₂O₃) | 0.2 | 0.6 | 12.9 |
| Lime (CaO) | 0.16 | 1.5 | 0.5 |
| Zirconia (ZrO₂) | 66.1 | | |
| Magnesia (MgO) | 0.04 | 94.8 | 19.5 |
| Chromic Oxide (Cr₂O₃) | | | 32.7 |

The ball milled fines used in the exemplary mixes were substantially all passing 65 mesh.

The scientific principles upon which this invention are based are not entirely understood. For example, the addition of chrome ore to the brick would be expected to make the structure discontinuous and thereby lower the modulus of elasticity of the brick; however, it would also be expected to reduce the tensile strength at elevated temperatures for the same reason. Nevertheless, brick according to this invention have increased hot tensile strength and decreased moduli of elasticity.

Having thus described the invention in detail, and with sufficient particularity as to enable those skilled in the art to practice it, what is desired to have protected by Letters Patent is set forth in the following claims.

I claim:
1. Burned basic refractory brick consisting essentially of 5 to 20%, by weight, zircon sand, 20 to 50%, by weight, chrome ore, 30 to 75%, by weight, dead burned magnesite, said zircon all passing 65 mesh, said chrome ore substantially all passing 14 mesh and at least 50% passing 28 mesh, said magnesite is sized such that the overall batch comprises from 40 to 60%, by weight, plus 28 mesh, from 40 to 60%, by weight, minus 65 mesh.

2. Burned brick according to claim 1 which are microscopically characterized by chrome ore and magnesite grains held by discontinuous forsterite matrix containing dispersed zirconia deposits.

3. Brick according to claim 1 typically comprising 30% chrome ore, 62% magnesite, and 8% zircon.

4. Brick according to claim 1 having a modulus of rupture at 2300° F. in excess of 1000 p.s.i.

5. Method of making burned basic refractory brick comprising:
 (1) preparing a batch consisting essentially of 5 to 20%, by weight, zircon sand, 20 to 50%, by weight, chrome ore, 30 to 75%, by weight, dead burned magnesite, said zircon all passing 65 mesh, said chrome ore substantially all passing 14 mesh and at least 50% passing 28 mesh, said magnesite sized such that the overall batch comprises from 40 to 60%, by weight, plus 29 mesh material and from 40 to 60%, by weight, minus 65 mesh material;
 (2) tempering the batch;
 (3) forming the batch into shapes;
 (4) burning said shapes at temperatures in excess of about 2800° F.

References Cited

UNITED STATES PATENTS 3,192,059  6/1965  Good et al. _____ 106—57
3,309,209  3/1967  Martinet et al. _____ 106—57

JAMES E. POER, Primary Examiner

U.S. Cl. X.R.
106—59